United States Patent
Pierson et al.

(10) Patent No.: US 10,171,430 B2
(45) Date of Patent: Jan. 1, 2019

(54) MAKING A SECURE CONNECTION OVER INSECURE LINES MORE SECURE

(71) Applicants: Forrest L. Pierson, Dallas, TX (US); Edward Reed Brooks, Plano, TX (US)

(72) Inventors: Forrest L. Pierson, Dallas, TX (US); Edward Reed Brooks, Plano, TX (US)

(*) Notice: Subject to any disclaimer, the term of this patent is extended or adjusted under 35 U.S.C. 154(b) by 147 days.

(21) Appl. No.: 15/221,107

(22) Filed: Jul. 27, 2016

(65) Prior Publication Data

US 2017/0034135 A1 Feb. 2, 2017

Related U.S. Application Data

(60) Provisional application No. 62/197,325, filed on Jul. 27, 2015.

(51) Int. Cl.
| | |
|---|---|
| *H04L 29/06* | (2006.01) |
| *H04L 1/00* | (2006.01) |
| *H04L 9/00* | (2006.01) |
| *H04L 9/06* | (2006.01) |
| *H04B 10/85* | (2013.01) |

(52) U.S. Cl.
CPC ........ *H04L 63/0428* (2013.01); *H04L 1/0061* (2013.01); *H04L 9/00* (2013.01); *H04L 9/065* (2013.01); *H04B 10/85* (2013.01)

(58) Field of Classification Search
CPC .. H04L 63/0428; H04L 63/145; H04L 63/166
See application file for complete search history.

(56) References Cited

U.S. PATENT DOCUMENTS

| | | |
|---|---|---|
| 5,022,025 A | 6/1991 | Urushidani et al. |
| 5,477,536 A | 12/1995 | Picard |
| 6,594,229 B1 | 7/2003 | Gregorat |
| 6,964,008 B1 * | 11/2005 | Van Meter, III .... G06F 11/1004 714/766 |
| 7,002,908 B1 | 2/2006 | Lund et al. |
| 7,327,760 B1 | 2/2008 | Parruck et al. |
| 7,352,745 B2 | 4/2008 | Perera et al. |
| 7,616,646 B1 | 11/2009 | Ma et al. |

(Continued)

OTHER PUBLICATIONS

CIPO, Office Action in Canadian Patent Application No. 2,904,659 dated Apr. 7, 2017.

(Continued)

*Primary Examiner* — Dao Q Ho
(74) *Attorney, Agent, or Firm* — NK Patent Law

(57) ABSTRACT

A secure or insecure communications channel for a secure communications system that carries sensitive user datagrams inside a proprietary or other undisclosed protocol so as to be able to encrypt the entire user datagram, including all header information so that if a malevolent entity were covertly or otherwise receiving said transmission they would be unable to determine the destination addresses of the user datagrams. Further the proprietary or undisclosed protocol is broken up into packets whose packet-to-packet boundaries are hidden so that malevolent entities will not be able to glean any information from the changes in traffic that occur during stimuli designed to provoke an expected response, thereby rendering said malevolent entities unable to determine what actual responses are occurring during real world events.

12 Claims, 5 Drawing Sheets

(56) References Cited

U.S. PATENT DOCUMENTS

| | | |
|---|---|---|
| 8,345,675 B1 | 1/2013 | Raghunath |
| 2002/0080790 A1 | 6/2002 | Beshai |
| 2003/0012179 A1 | 1/2003 | Yano et al. |
| 2003/0048781 A1 | 3/2003 | Pierson |
| 2004/0032856 A1 | 2/2004 | Sandstrom |
| 2005/0097361 A1* | 5/2005 | Apostolopoulos ...... G06F 21/64 726/4 |
| 2006/0023640 A1 | 2/2006 | Chang et al. |
| 2007/0147364 A1 | 6/2007 | Palacharla et al. |
| 2007/0248115 A1 | 10/2007 | Miller et al. |
| 2008/0219254 A1 | 9/2008 | Haney |
| 2008/0301537 A1 | 12/2008 | Isono |
| 2009/0154475 A1 | 6/2009 | Lautenschlaeger |
| 2009/0201909 A1 | 8/2009 | Bou-Diab et al. |
| 2010/0165984 A1 | 7/2010 | Aybay et al. |
| 2011/0317559 A1 | 12/2011 | Kern et al. |
| 2012/0147744 A1 | 6/2012 | Lee |
| 2012/0271961 A1 | 10/2012 | Alshinnawi et al. |
| 2012/0287926 A1 | 11/2012 | Anantharam et al. |
| 2014/0149821 A1* | 5/2014 | Zhou .................... H04L 1/0061 714/758 |
| 2016/0337083 A1* | 11/2016 | Englert ................ H04L 1/0061 |

OTHER PUBLICATIONS

USPTO, Non-Final Rejection in U.S. Appl. No. 14/021,563 dated Mar. 13, 2015.
USPTO, Final Rejection in U.S. Appl. No. 14/021,563 dated Jul. 28, 2015.
Form PCT/IB373, International Preliminary Report on Patentability dated Sep. 15, 2015 for PCT Application No. PCT/US2014/020089.
European Patent Office, Extended European Search Report for European Patent Application No. 14778494.6 dated May 16, 2017.
USPTO, Non-Final Rejection for U.S. Appl. No. 14/021,563 dated Aug. 18, 2016.
USPTO, Notice of Allowance in U.S. Appl. No. 14/021,563 dated Dec. 21, 2016.
European Patent Office, Supplementary Partial European Search Report for European Patent Application No. 14778494.6 dated Feb. 13, 2017.
CIPO, Examination Report in Canadian Patent Applicatioin No. 2,904,659 dated Sep. 16, 2016.

\* cited by examiner

MAKING A SECURE CONNECTION OVER INSECURE LINES MORE SECURE

CROSS REFERENCE TO RELATED APPLICATION

This application claims the benefit of U.S. Provisional Patent Application 62/197,325, the entirety of which is incorporated by reference herein.

TECHNICAL FIELD

The present disclosure relates to data communication. More particularly, the present disclosure relates to scrambling and encrypting data being carried over an insecure line in such a fashion that unauthorized receivers of the data stream would be unable to glean any useful information from it.

BACKGROUND

Secure systems must on occasion communicate with each other over physical media that is susceptible to being compromised, that is, having their communications between each other copied with or without their knowledge or consent. Under such circumstances, much can be gleaned by malevolent parties even if the datagram payloads are securely encrypted. For example, a malevolent party may initiate an activity that will be responded to, and by analyzing the change in traffic patterns over the insecure line, the malevolent party can profile the response of the secure systems. After several such profiling events with corresponding responses to a variety of different profiling events, a malevolent party can determine very accurate predictions as to what the response of the secure systems will be when major real world events happen.

What is needed are methods, devices, and systems that make all such communications appear as nothing but a chaotic stream of random bits so that there is no covert way to distinguish between traffic caused by a response to malevolent stimuli or to a major event, versus routine or idle traffic.

SUMMARY OF THE DISCLOSURE

This Summary is provided to present in simplified form a practical implementation of the present disclosure, as well as an explanation as to why certain features are claimed. To achieve the goals outlined in the Background, various exemplary embodiments of the subject matter described herein are presented. The examples presented below are intended to be illustrative and not limiting.

Methods and systems for making a secure connection over insecure lines more secure are presented herein. According to one embodiment, methods or systems that use the principles of the subject matter described herein will be able to:

- disguise or encrypt all source and destination addresses in the headers of datagrams traveling through it;
- scramble the location of datagram boundaries in such a fashion that they cannot be distinguished; and
- make indistinguishable the differences between datagram payloads carrying priority traffic versus routine traffic and idle times.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 illustrates packet header according to some embodiments of the present disclosure;

FIG. 2 graphically illustrates the formatting of network traffic according to some embodiments of the present disclosure;

FIG. 3 graphically illustrates a modified formatting of network traffic according to some embodiments of the present disclosure;

DETAILED DESCRIPTION

Figure 1:
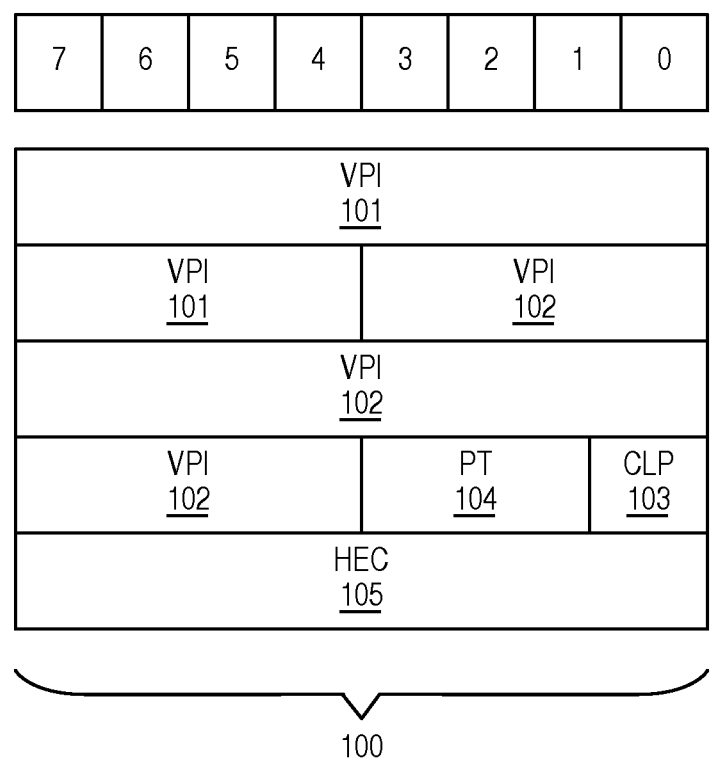

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Throughout this specification, like reference numbers signify the same elements throughout the description of the figures.

When elements are referred to as being "connected" or "coupled", the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media is non-transitory and includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage components, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Recitation of ranges of values herein are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. For example, the range "1 to 10" shall be interpreted to specifically include whole numbers between 1 and 10 (e.g., 1, 2, 3, . . . 9) and non-whole numbers (e.g., 1.1, 1.2, . . . 1.9).

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Where a process is described in an embodiment the process may operate without any user intervention.

In some embodiments, user datagrams are disassembled into fixed sized packets (200) and encapsulated inside a proprietary protocol (not disclosed or placed in the public domain) that is carried over a concatenated SONET interface (e.g., OC-192c). This speed and format was chosen because it is a commonly used protocol available in networks throughout the world and especially North American, and because it is sufficiently fast that programmable logic, which is the preferred method of choice for hostile entities to try and develop algorithms that will eventually detect and lock onto the frame boundaries of the proprietary protocol, cannot operate at this speed. For this reason other links of similar or higher speed will also be good candidates to host this system.

In some embodiments, the proprietary protocol may run asynchronously to the framing boundaries of the SONET interface, with the result that the boundaries of packets (200) carried over the proprietary protocol are not likely to be in synchronization with the SONET signal boundaries. SONET signal boundaries are easily discerned and locked onto. The boundaries of the proprietary protocol need to be kept obscure from malevolent eavesdroppers to enhance the ability of this system to hide the difference between idle and routine traffic versus priority traffic.

FIG. 1 illustrates a packet header according to some embodiments of the present disclosure. The cell is comprised of a VPI (Virtual Path Identifier) 101, VIP (Virtual Path Identifier) 102, PT (Packet Type) 104, CLP (Cell Loss Priority) 103, and a HEC (Header Error Checking) 105.

Figure 2:
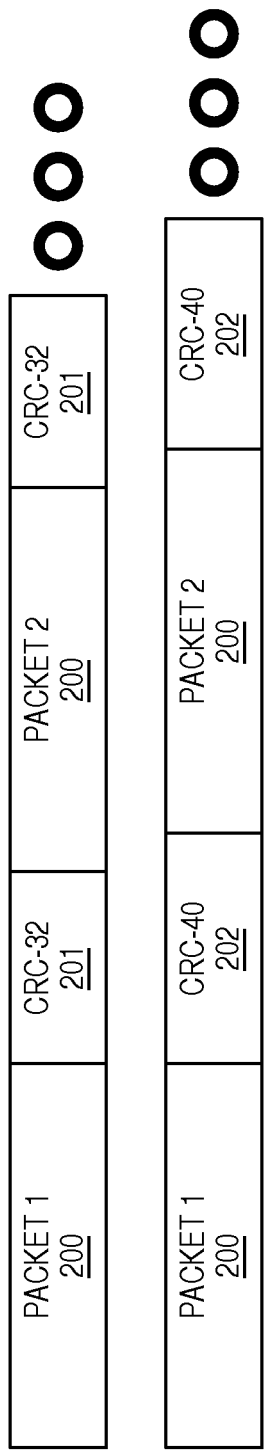

FIG. 2 graphically illustrates the formatting of network traffic according to some embodiments of the present disclosure. The network traffic is comprised of packets 200 and CRC (cyclic redundancy check) 201.

In some embodiments, the proprietary protocol may avoid the use of framing patterns that are conventionally used to identify protocol boundaries. Instead, a CRC (201 or 202) is appended to the protocol, and the framing boundaries are determined by correctly synchronizing up to the CRC checksum generated for each packet (200). As a result of changing values in each packet (200), the checksum will change as well, eliminating any kind of a repeating pattern. It is a method that has worked in the past to allow systems to frame to ATM cells using the HEC (105) of the header (100) as the framing pattern when ATM cells are carried in DS-3 and SONET signals. The differences between that application and the present disclosure is that the CRC polynomial in this system is larger and unknown to the malevolent parties, and it can change during operation to a new, unknown polynomial at a time not known to the malevolent eavesdroppers.

In some embodiments, the CRC (201, 202) may change in both pattern and size on command. By changing in size, the total number of bits that needs to be transmitted per packet (200) will change, again throwing malevolent receivers off as to the number of bits between the leading edge of each packet (200). This is illustrated in FIG. 2, where the first packet (200) starts out concurrently with another such packet (200) just below it. As the packet is transmitted (progressing to the right in the illustration), the generated CRC (201 or 202) is appended to each packet (200). Since the second CRC (202) is longer than the first CRC (201), the second packet (200) following it is no longer transmitted concurrently with the second packet (200) transmitted immediately after the first CRC (201). There are more bits between the start of successive packets (200) with the CRC-40 (202) then there are with successive packets (200) with the CRC-32 (201). Whenever a CRC algorithm is changed, changing the number of bits in the CRC, the number of bits between the start of successive packets (200) change, confounding the efforts of malevolent parties to try and detect the packet boundaries.

Figure 3:
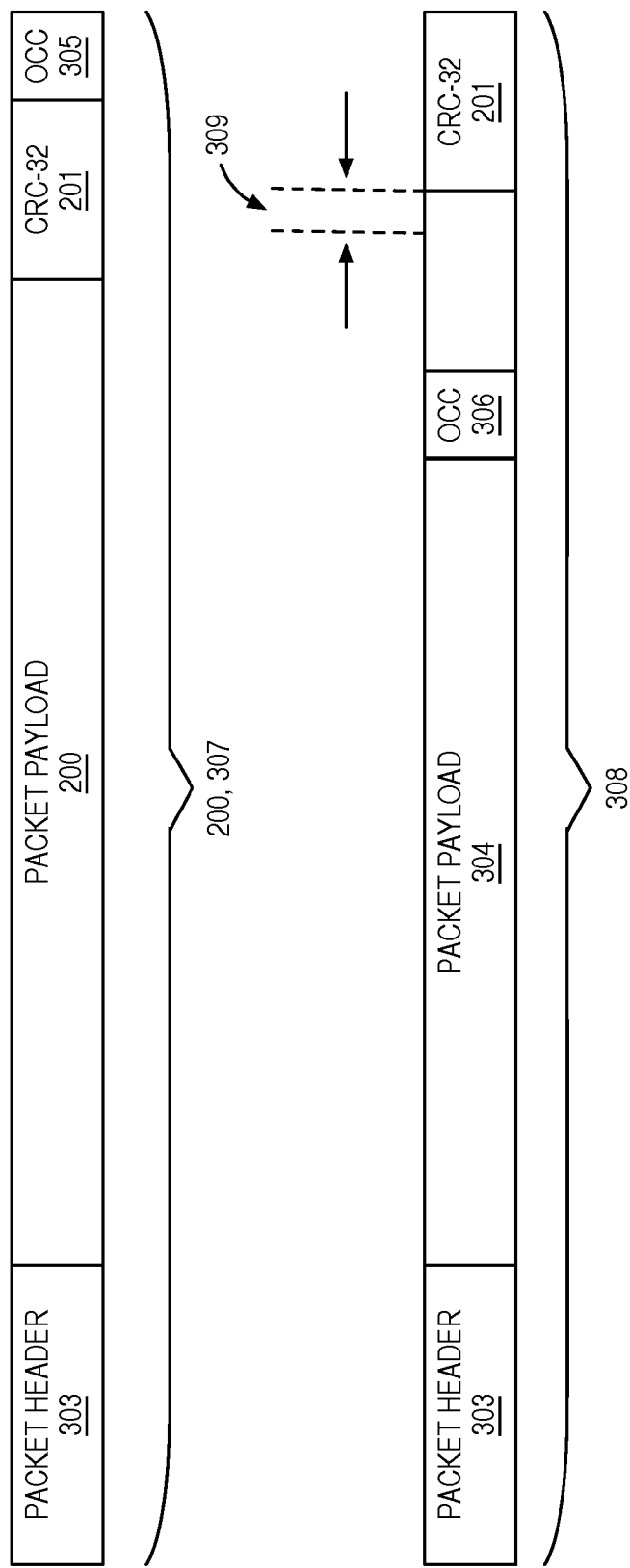

FIG. 3 graphically illustrates a modified formatting of network traffic according to some embodiments of the present disclosure.

In some embodiments, because the user datagram is carried inside the proprietary protocol, its entire contents, not just the payload, may be encrypted with a key that is intractable to crack. There is no need to leave the destination address unencrypted, which makes it impossible for anyone trying to analyze the traffic pattern to determine what the final destination of the user datagram is even if they briefly managed to lock onto the proprietary protocol's framing pattern.

In some embodiments, after segmented packets (200) of the encrypted user datagram are placed inside the proprietary protocol and a CRC checksum (201 or 202) is calculated for each packet, an overhead communications channel (OCC) (305) will be added to the bit stream.

In some embodiments, the packet (200), CRC checksum (201 or 202), and the OCC (305) may originate in a specialized piece of hardware attached to the transmitting system, and may be destined for a similar but complimentary piece of hardware in the receiving system. In one embodiment, the receiving hardware may a) strip off the OCC (305), b) synchronize to the proprietary protocol's packet boundaries using the CRC checksum (201 or 202), c) identify the packet (200) boundaries, d) extract the segmented packets contained in each packet payload (304), e) re-assemble the entire encrypted user datagram, and f) decrypt the user datagram. It may then analyze the destination address and routes the datagram through the secure receiving system.

In some embodiments, during idle periods of time the specialized piece of hardware may transmit random data that mimics actual traffic and may have a small field in it that contains information with which the receiving hardware may determine that it is idle (and the data being transmitted is therefore random) and can be rejected. As an example, this can include a randomly changing series of destination addresses in the packet header (303) that are each invalid, causing the packet (200) to be dropped. Since the difference is minor and will be hidden by the encryption performed in FIG. 4, the inability of malevolent receivers to discern the boundaries of the packet means they won't be able to distinguish idle packets from packets carrying actual traffic.

In some embodiments, an OCC (306) may be intermixed with the packet contents in either the header (303) or payload (304), but added to it after the CRC calculations for the proprietary protocol are made. Not knowing where the OCC is, malevolent receivers will have their CRC calculations thrown off even further. The OCC will be placed in the communications channel in deterministic but changing values, further frustrating the efforts of malevolent parties. The OCC may be used to carry command and status between the specialized pieces of hardware mentioned in the paragraph above. In one embodiment, at varying but deterministic intervals, a bit of the OCC (305, 306) will be added to the transmitted signal. This bit of the OCC (305, 306) will be removed at the receiving end before the CRC calculations are verified to frame the proprietary protocol's packet boundaries. Some OCC (305) bits will be added between packets, but other OCC (306) bits will be inserted in the midst of a packet. Before the OCC (306) in the midst of the packet is removed, the end of the packet (301) would be in a different bit position than what it would be in if the OCC (306) had not been inserted in the midst of the packet (307) as identified by the gap shown between the ending of the two packets (302). A receiver that does not know where these bits are would be unable to remove them properly, which will throw their CRC calculations off and make it almost mathematically impossible to find the proprietary protocol packet boundaries.

In some embodiments, how the bit times of the OCC vary may be determined by a pre-arranged list of algorithms that are hand carried by a trusted courier between the two secure systems.

In some embodiments, the OCC may be used to instruct the receiving end how, and when, the algorithm for how the control bit time spacing will be changed. It may also instruct the receiving end how, and when, the CRC polynomial for framing the proprietary protocol packet boundaries will change. The OCC may also inform the receiving end if its own receiver has lost synchronization with transmitter. When this happens, both ends may resynchronize using a default set of polynomials and OCC (305, 306) bit stuffing algorithms. After re-synchronizing, they change to other algorithms and polynomials from the lists at each location. For this reason, each receiver must be looking for the default OCC (305, 306) bit spacing algorithm as well as the changed algorithm.

Figure 4:
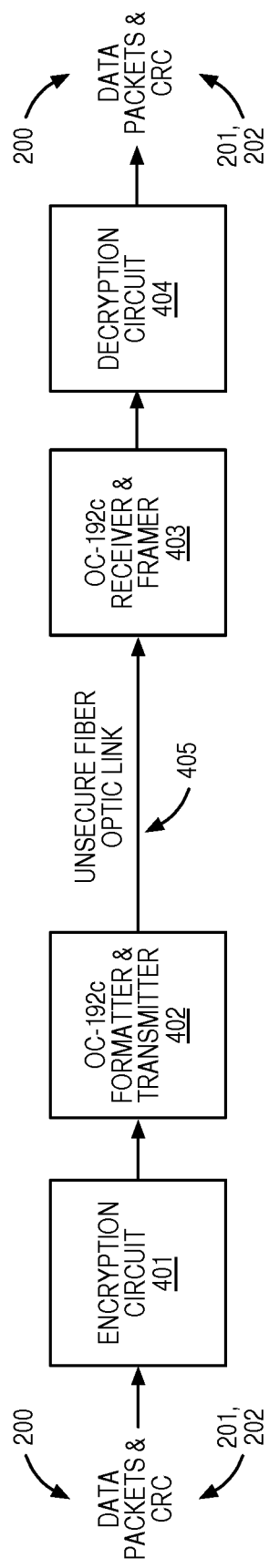
FIG. 4 is block diagram of components involved in transmitting and receiving the network traffic.

Referring now to FIG. 4, the encryption circuit (401) is added just prior to the OC-192c Formatter & Transmitter (402). The encrypted signal is then transmitted over the unsecure fiber optic link (405) and received and the OC-192c Receiver and Framer (403). The encrypted payload is then passed through the Decryption Circuit (404) regenerating the packets (200) and their CRCs (201, 202) for packet boundary framing and packet extraction.

Figure 5:
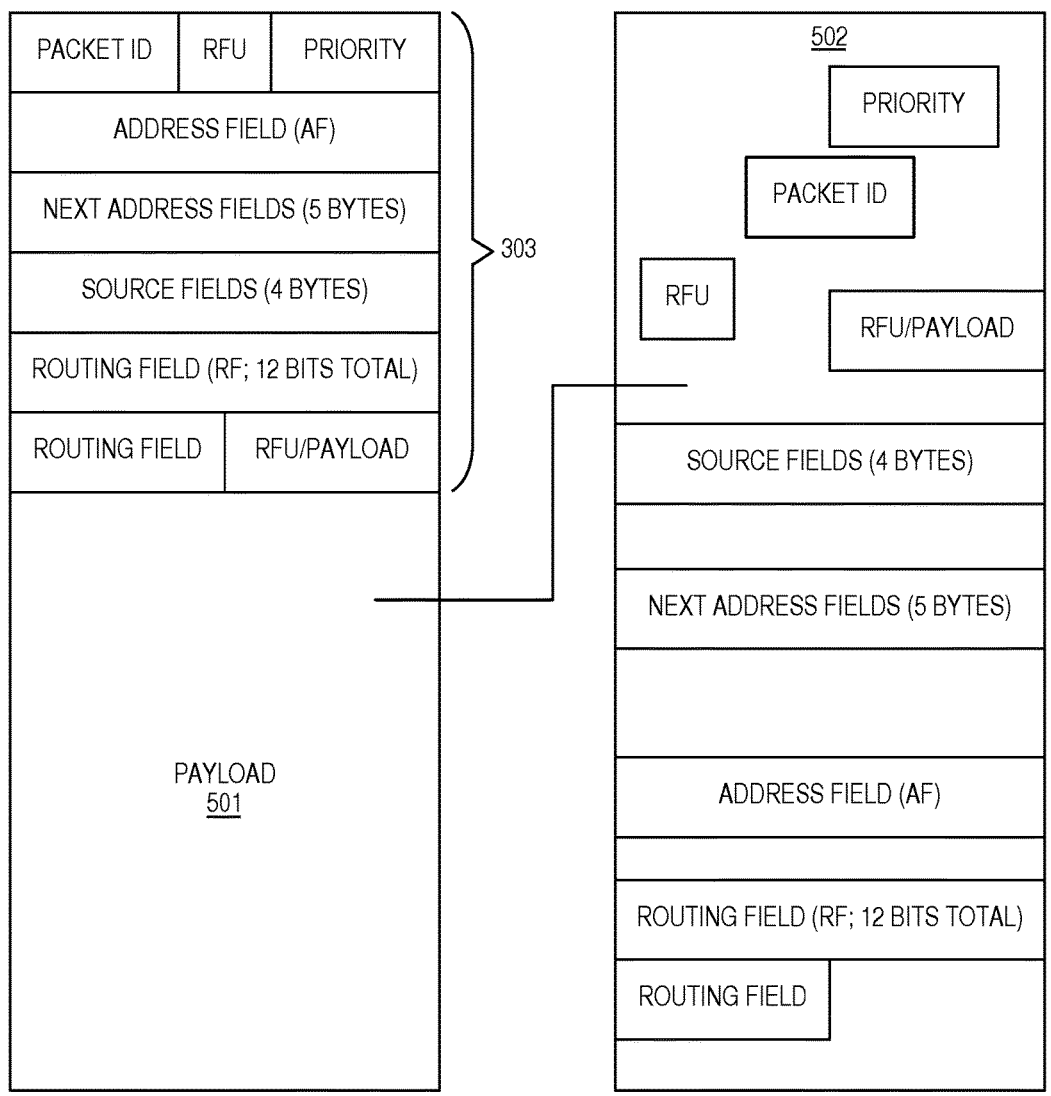
FIG. 5 illustrates a modified networking packet according to some embodiments of the present disclosure.

Referring now to FIG. 5, in some embodiments, as illustrated in FIG. 5, the packet header (303) does not all have to be in continuous bits at the beginning of the packet (200, 307, or 301). In the illustration, a packet header (303) similar to the packet header used in the High Capacity Communications Core (HCC-Core) is used as an example. The HCC-Core packet is illustrated on the left side of the FIG. 501). The different fields in the packet header (303) may be placed at different but known intervals, intermixed with the packet payload (304). A table is used by the transmitting end to re-arrange the locations of the packet header fields into different positions within the payload, and the packet is transmitted in a scrambled form that is illustrated on the right side of the FIG. 502). At the receiving end a complimentary table re-arranges the packet header (303) back into its original shape (501). Further, the scrambling of packet headers among the payload in one direction does not have to match the same pattern in the other direction. And further, the packet payload size can be changed (although it will remain fixed at whatever the selected size is). By the use of this table, a single integrated circuit can be used at each location that use this system, with each channel having a unique combination of packet size and header scrambling. Thus, if one location becomes compromised (most likely by an insider gaining access to the specific algorithms for the channel and revealing it to malevolent parties) it will not compromise the communications over any other channel as each channel's combination of header field locations and payload sizes can be unique.

This summary does not limit the scope of the ability of the claims to disguise packet boundaries. Two concurrent methods are mentioned in the summary—using changeable CRC polynomials to frame packet boundaries, and inserting at changing intervals extra OCC bits that will throw the CRC calculations off if they are not properly removed. Other methods of hiding packet boundaries by changing the boundary locations, while still using the insertion of the bits of the OCC (305, 306), are possible. Methods of identifying packet boundaries by using other algorithms besides CRC polynomials are possible and are covered by the scope of these claims although they are not explicitly mentioned. More than two concurrent methods may be employed as well. Further, each unsecure link that uses this system can have a unique packet size and header scrambling arrangement, which means that if one unsecure link becomes compromised it will not compromise any other unsecure link between any two secure facilities that use this system.

Those skilled in the art will recognize improvements and modifications to the embodiments of the present disclosure. All such improvements and modifications are considered within the scope of the concepts disclosed herein and the claims that follow.

The invention claimed is:

1. A communication system comprising:
   encryption circuitry;
   formatter circuitry electrically coupled with the encryption circuitry; and
   transmitter circuitry electrically coupled with the formatter circuitry, wherein:
   the encryption circuitry is configured for:
   receiving user datagrams;
   determining a first packet-to-packet boundary, a second packet-to-packet boundary, and a third packet-to-packet boundary of the user datagrams;
   encrypting the user datagrams to provide encrypted datagrams;
   calculating a first checksum for encrypted data between the first packet-to-packet boundary and the second packet-to-packet boundary, wherein the first checksum is a first quantity of bits;
   inserting the first checksum to the encrypted datagrams at the second packet-to-packet boundary;
   calculating a second checksum for encrypted data between the second packet-to-packet boundary and the third packet-to-packet boundary, wherein the second checksum is a second quantity of bits and the second quantity of bits is greater than the first quantity of bits; and
   inserting the second checksum to the encrypted data at the third packet-to-packet boundary, and
   providing the encrypted datagrams, the first checksum, and the second checksum to the formatter circuitry, wherein the encryption circuitry is further configured to provide an overhead communications channel having a variable bitrate,
   wherein the variable bitrate is determined at least in part by a datagram bitrate and a fixed payload availability of the formatted bit stream;
   the formatter circuitry is configured for:
   inserting the encrypted datagrams, the first checksum, and the second checksum as payload data to a formatted bit stream having a total bitrate of approximately 10 gigabits per second; and
   providing the formatted bit stream to the transmitter circuitry, wherein the formatted bit stream is compliant to a public switched network; and
   the transmitter circuitry is configured for optically transmitting the formatted bit stream over the public switched network.

2. The communication system of claim 1, wherein the public switched network is a SONET compliant network.

3. The communication system of claim 2, wherein the formatted bit stream is an OC-192c compliant bit stream.

4. The communication system of claim 1, wherein the encrypted datagrams, the first checksum, the second checksum, and the overhead communications channel provide at least a portion of a proprietary protocol and the proprietary protocol is unknown to the public switched network.

5. The communication system of claim 1, wherein the first and second checksums are calculated using Cyclic Redundancy Check (CRC) algorithms.

6. The communication system of claim 1 further comprising:
   receiver circuitry;
   framer circuitry electrically coupled with the receiver circuitry;
   decryption circuitry electrically coupled with the framer circuitry, wherein:
   the receiver circuitry is configured for:
   optically receiving the formatted bit stream from the public switched network; and
   providing the formatted bit stream to the framer circuitry;
   the framer circuitry is configured for:
   extracting the encrypted datagrams, the first checksum, and the second checksum from the payload data of the formatted bit stream; and
   providing the encrypted datagrams, the first checksum, and the second checksum to the decryption circuitry;
   the decryption circuitry is configured for:
   determining a location of the first checksum;
   determining a location of the second checksum;
   determining the first packet-to-packet boundary, the second packet-to-packet boundary, and third the packet-to-packet boundary are based at least in part on the locations of the first checksum and the second checksum; and
   decrypting the encrypted datagrams based on the location of the first packet-to-packet boundary, the second packet-to-packet boundary, and third the packet-to-packet boundary.

7. The communication system of claim 6, wherein the public switched network is a SONET compliant network.

8. The communication system of claim 7, wherein the formatted bit stream an OC-192c compliant bit stream.

9. The communication system of claim 6, wherein the encryption circuitry is further configured to provide an overhead communications channel having a variable bitrate.

10. The communication system of claim 9, wherein the variable bitrate is determined at least in part by a datagram bitrate and a fixed payload availability of the formatted bit stream.

11. The communication system of claim 10, wherein the encrypted datagrams, the first checksum, the second checksum, and the overhead communications channel provide at least a portion of a proprietary protocol and the proprietary protocol is unknown to the public switched network.

12. The communication system of claim 6, wherein the first and second checksums are calculated using Cyclic Redundancy Check (CRC) algorithms.

* * * * *